(12) United States Patent
Utz et al.

(10) Patent No.: US 8,222,774 B2
(45) Date of Patent: Jul. 17, 2012

(54) SYSTEM AND METHOD FOR ENCLOSING INFORMATION HANDLING SYSTEM COMPONENT DEVICES

(75) Inventors: James Utz, Round Rock, TX (US); Kyle Spiess, Round Rock, TX (US); Kevin Mundt, Austin, TX (US); Karlene Berger, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 587 days.

(21) Appl. No.: 12/412,918

(22) Filed: Mar. 27, 2009

(65) Prior Publication Data

US 2010/0251277 A1    Sep. 30, 2010

(51) Int. Cl.
*F16P 3/00* (2006.01)
(52) U.S. Cl. ........................................................ 307/328
(58) Field of Classification Search .................. 307/326, 307/328, 119; 324/207.2; 720/639, 647; 713/300, 320
See application file for complete search history.

(56) References Cited

U.S. PATENT DOCUMENTS

| | | | |
|---|---|---|---|
| 3,671,767 A | 6/1972 | Davis | |
| 6,243,819 B1 * | 6/2001 | Jung | 713/320 |
| 6,356,741 B1 * | 3/2002 | Bilotti et al. | 455/90.1 |
| 6,622,012 B2 * | 9/2003 | Bilotti et al. | 455/575.3 |
| 6,766,394 B1 * | 7/2004 | Shimura et al. | 710/100 |
| 7,137,128 B2 * | 11/2006 | Shimada et al. | 720/601 |
| 2009/0029745 A1 * | 1/2009 | Eaton | 455/575.1 |
| 2009/0251374 A1 * | 10/2009 | Degner et al. | 343/702 |

* cited by examiner

*Primary Examiner* — Jared Fureman
*Assistant Examiner* — Daniel Cavallari
(74) *Attorney, Agent, or Firm* — Hamilton & Terrile, LLP; Robert W. Holland

(57) ABSTRACT

An information handling system component contained within an information handling system housing uses the information handling system housing as at least a portion of a safety enclosure for hazardous functions of the component. A lock out device disables the hazardous function if the information handling system housing is moved relative to the component. For example, an optical disc drive laser is disabled if a Hall effect sensor in the chassis of the optical disc drive no longer senses a magnet placed in a portion of the information handling system housing used to enclose the optical disc drive.

11 Claims, 2 Drawing Sheets

SYSTEM AND METHOD FOR ENCLOSING INFORMATION HANDLING SYSTEM COMPONENT DEVICES

BACKGROUND OF THE INVENTION

1. Field of the Invention

The present invention relates in general to the field of information handling system components, and more particularly to a system and method for enclosing information handling system component devices.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are typically built in portable or stationary configurations. Portable information handling systems have smaller-sized housings that allow use of the system on the go. Integrated power, I/O and display devices support system operation free from permanent connections to external power and peripherals. Stationary information handling systems have housings of a wide variety of shapes and sizes that support use of the system in a fixed location. Desktop, tower and server information handling systems typically interface with external power and I/O devices. Manufacturers generally try to build information handling systems in as small a chassis as possible for the functionality supported by the information handling systems. Smaller sized stationary information handling systems are more convenient because a smaller footprint fits better in space-constrained locations, such as a user desk or a data center. Smaller sized portable information handling systems are more convenient for users since a smaller size and decreased weight make a portable information handling system less awkward to handle and less burdensome to carry. Generally, as an information handling system housing decreases in size, functionality also decreases because less room is available to fit in component devices and smaller space makes thermal transfer more difficult to accomplish.

Component devices used to build an information handling system include hard disk drives and optical drives, such as CD, DVD and BD drives, which store information for use in processing by a CPU or other processor. Some component devices are built in their own housing so that the component device housing fits within the information handling system housing. For example, optical drives that include one or more lasers to read and write information typically are built into a class 1 laser enclosed device housing. ANSI standards require that class 1 laser device housings have safety interlocks wherever the housing can be opened so that the laser within the device will not emit laser light that could injure an end user. The safety interlocks prevent emission of a beam of radiant energy above a minimum standard from leaving the laser or laser system. Service adjustments or maintenance work performed on the optical drive must not render the interlocks inoperative or cause exposure levels outside the housing to exceed the minimum standard unless the work is performed in an approved area with limited access and appropriate safeguards, supervision and control. The protective housing and optical drive must have a fail-safe design so that, if a failure occurs, the system will continue to meet the safety requirements for enclosed laser operations. The use of an optical drive housing within an information handling system housing tends to add to the size and weight of the information handling system.

SUMMARY OF THE INVENTION

Therefore a need has arisen for a system and method which encloses information handling system component devices and information handling systems in a common housing.

In accordance with the present invention, a system and method are provided which substantially reduce the disadvantages and problems associated with previous methods and systems for enclosing information handling system component devices. At least a portion of a safety enclosure for an information handling system component is formed with a portion of the housing of the information handling system. A lock out device detects removal of the shared housing portion to disable one or more functions of the component.

More specifically, an information handling system is built from a plurality of electronic components, such as a CPU, RAM, a hard disk drive and chipset, which cooperate to process information. A component disposed in a housing of the information handling system performs one or more functions that call for a safety enclosure, such as an optical disc drive, which uses a laser to read and write information. A safety enclosure for the component is formed at least in part by a portion of the housing that encloses the information handling system, such as a side wall, a keyboard or a palm rest. A lock out device detects a breach of the safety enclosure, such as removal of the information handling system housing relative to a chassis of the optical disc drive. For example, a Hall effect switch disposed in the optical disc drive chassis detects proximity to a magnet integrated in the information handling system housing portion that forms a portion of the optical disc drive safety enclosure. For example, if a keyboard, palm rest or side wall of the information handling system housing proximate the optical disc drive is removed, movement of the magnet in the housing portion distal from the Hall effect sensor in the optical disc drive chassis causes the Hall effect sensor to command disablement of a laser in the optical disc drive.

The present invention provides a number of important technical advantages. One example of an important technical advantage is that the housing of an information handling system also serves as a safety housing of an internal component so that the weight and size of the internal component is reduced. A lock out device detects removal of the information handling system housing to lock out operation of one or more component functions in response to removal of the information handling system housing. In the case of an optical disc drive, a laser device internal to the optical drive is prevented from operation upon removal of a portion of the information handling system housing that also forms the optical disc drive housing. The information handling system housing forms an ANSI Class 1 Enclosure of the laser device. Combining the optical disc drive housing and information handling system housing reduces the size and weight of the information handling system for improved usability.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Forming a safety enclosure around an information handling system component with at least a portion of the housing of the information handling system limits the need for redundant enclosures of the component. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
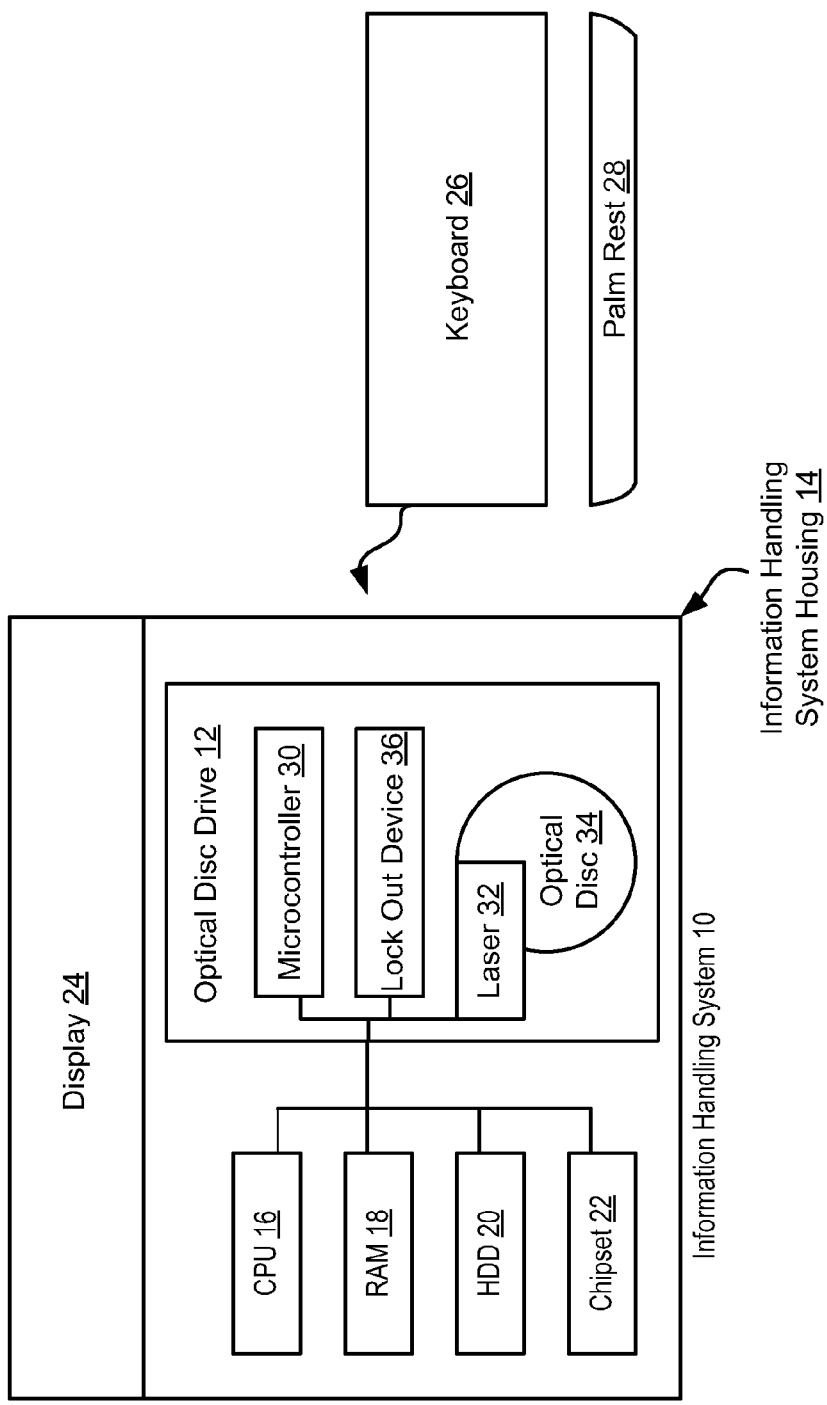
FIG. 1 depicts a block diagram of an information handling system having an internal component with a safety enclosure formed at least in part by portions of the information handling system housing.

Referring now to FIG. 1, a block diagram depicts an information handling system 10 having an internal component 12 with a safety enclosure formed at least in part by portions of the information handling system housing 14. In the example embodiment depicted by FIG. 1, internal component 12 is an optical disc drive. Information handling system 10 is built from a plurality of electronic components disposed in information handling system housing 14, such as a CPU 16 that processes information, RAM 18 that stores information for access by CPU 16, a hard disk drive 18 that provides permanent storage of information and a chipset 20 that coordinates interaction of the electronic components to process information. Information handling system 10 includes an integrated display 24 that presents information as visible images. A keyboard 26 fits over the top of the electronic components and accepts end user inputs. A palm rest 28 near keyboard 26 provides a resting surface for an end user during typing at keyboard 26.

Optical disc drive 12 has a microcontroller 30 that controls a laser 32 for illumination of an optical disc 34 during information reads and writes. Laser 32 is, for example, an infrared laser that reads and writes to CD optical media, a red laser that reads and writes to DVD optical media or a blue laser that reads and writes to BD optical media. Optical disc drive 12 is an ANSI Class 1 Enclosure that must restrict illumination of laser 32 if an end user is at risk of exposure to the illumination. In order to limit end user exposure to illumination by laser 32, keyboard 26 and palm rest 28 rest across the upper surface of optical disc drive 12 so that information handling system housing 14 includes keyboard 26 and palm rest 28 and forms at least a portion of the safety enclosure around optical disc drive 12 to protect end users from exposure to illumination by laser 32 during operation of optical disc drive 12. A lock out device 36 detects the presence of keyboard 26 and palm rest 28 to restrict operation of laser 32 in the event of removal of keyboard 26 and palm rest 28. If keyboard 26 or palm rest 28 are removed, thus breaching the safety enclosure around optical disc drive 12, disabling of laser 32 maintains optical disc drive 12 within the requirements for ANSI Class 1 enclosures. In alternative embodiments, information handling system housing 14 forms all or other portions of optical disc drive 12's safety enclosure. In other alternative embodiments, other types of components having a variety of functions have a safety enclosure defined by information handling system housing 14, such as hard disk drives. Lock out device 36 disables one or more of the functions as desired to maintain a desired safety standard. Forming a safety enclosure of an internal component with the information handling system housing 14 reduces weight and footprint by limiting or eliminating the need for a separate housing around the component to form the safety enclosure.

Figure 2:
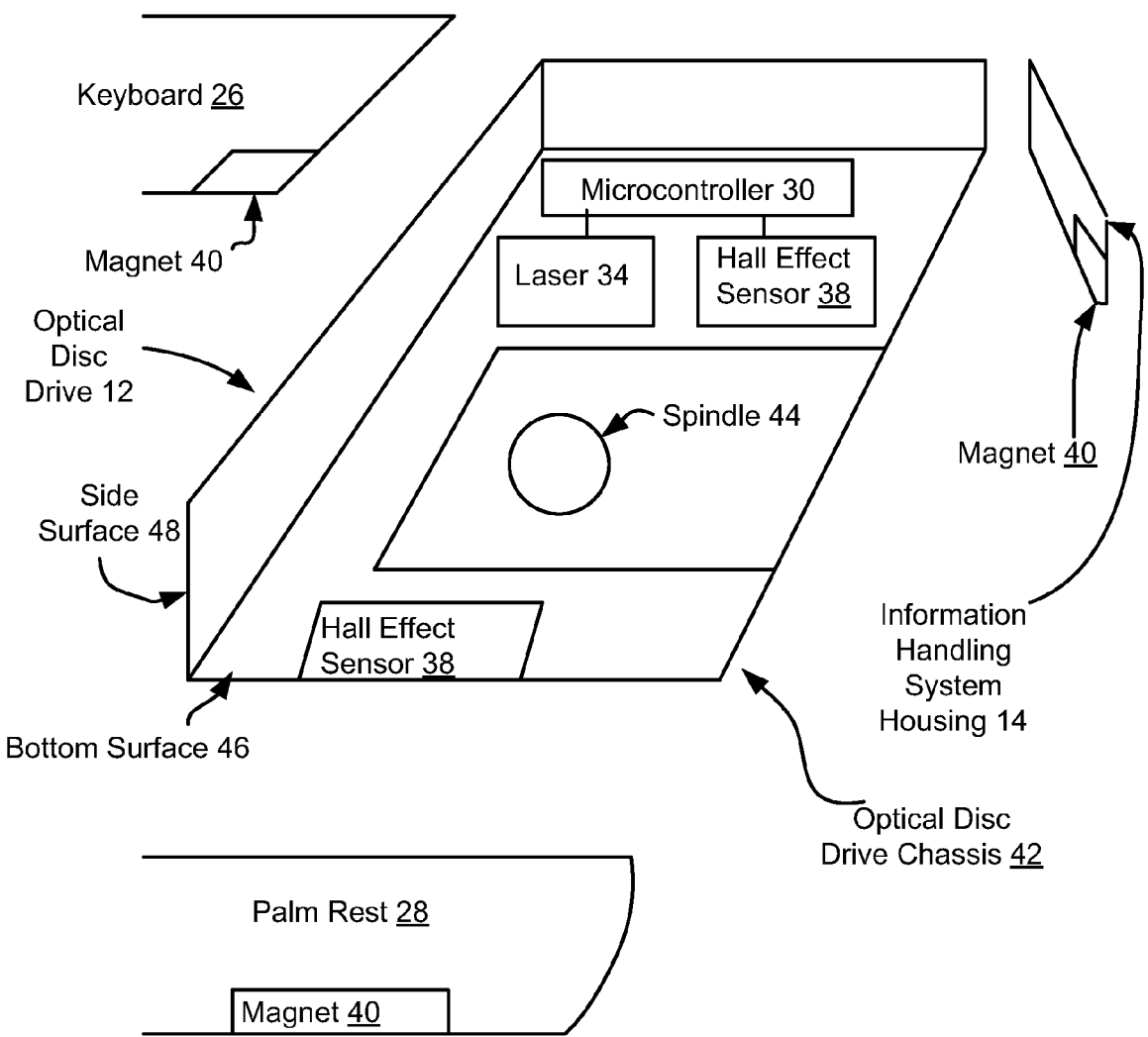
FIG. 2 depicts a block diagram of an optical disc drive having a safety enclosure formed at least in part by information handling system housing portions.

Referring now to FIG. 2, a block diagram depicts an optical disc drive 12 having a safety enclosure formed at least in part by information handling system housing portions 14, 26 and 28. In the example embodiment depicted by FIG. 2, lock out device 36 is built from a Hall effect sensor 38 disposed in optical disc drive 12 and a magnet 40 disposed in portions of information handling system housing 14 that form a safety enclosure about optical disc drive 12. Hall effect sensor 38 detects the presence of a magnet 40 and provides an enable signal to microcontroller 30 when in proximity to a magnet 40. When microcontroller 30 has an enable signal, microcontroller 30 allows application of power to laser 32; when microcontroller 30 loses the enable signal, microcontroller 30 disables one or more functions of optical disc drive 12. For example, in the absence of an enable signal, microcontroller 30 disables laser 32 but allows operation of other functions, such as spin at spindle 44. Disabling laser 32 in the absence of an enable signal from Hall effect sensor 38 ensures that laser 32 will not operate if a safety enclosure formed by information handling system housing 14 is breached. Requiring an enable signal by Hall effect sensor 38 fails optical disc drive 12 to a safe condition in the event of a failure of Hall effect sensor 38.

As depicted in the example embodiment of FIG. 2, multiple magnets 40 and Hall effect sensors 38 may be used to monitor the enclosure about optical disc drive 12. Optical disc drive chassis 42 contains the operational components of optical disc drive 12 within a bottom surface 46 and two side surfaces 48. A portion of information handling system housing 14 forms another side surface of optical disc drive 12 with a magnet 40 aligned with a Hall effect sensor 38. Removal of the side portion of information handling system housing 14 to remove magnet 40 from proximity to Hall effect sensor 38 will result in disablement of laser 32. The upper surface of optical disc drive 12 is formed by keyboard 26 and palm rest 28, each of which have a magnet 40 proximate a Hall effect sensor 38. If keyboard 26 or palm rest 28 are removed from their assigned positions over optical disc drive 12, the loss of the enablement signal from Hall effect sensor 38 causes microcontroller 30 to disable laser 32. In alternative embodiments, the loss of the enablement signal can cause microcontroller 30 to remove power from other functions of optical disc drive 12. In one alternative embodiment, magnet 40 is placed in optical disc drive chassis 42 and Hall effect sensors are placed in housing portions 14, 26 or 28 to command removal of power to optical disc drive 12 by components within information handling system 10. Optical disc drive chassis 42 can form a portion of the safety enclosure about optical disc drive 12 or, alternatively, the entire safety enclosure can be formed my information handling system housing 14. In another alternative embodiment, specific portions of information handling system components form the safety enclosure, such as a keyboard deflection plate that rests underneath the keyboard to provide physical support during use of the keyboard. Alternatively, the safety enclosure is formed by components, such as a PCIMCIA card, an Express card, a hard disk drive, a battery or other components that are proximate the laser drive. In other alternative embodiments, other types of lock out devices 36 may be used, such as a physical switch that is engaged by proximity of housing 14 to optical disc drive 12 or other types of proximity sensors.

Although the present invention has been described in detail, it should be understood that various changes, substitutions and alterations can be made hereto without departing from the spirit and scope of the invention as defined by the appended claims.

What is claimed is:

1. An information handling system comprising:
    a housing;
    a processor disposed in the housing, the processor operable to process information;
    memory disposed in the housing and interfaced with the processor, the memory operable to store information in support of the processor;
    a component disposed in the housing and interfaced with the processor, the component operable to perform one or more functions; and
    a lock out device associated with the component and the housing, the lock out device operable to detect removal of at least a portion of the housing and to disable one or more component functions in response to detecting removal of at least a portion of the housing;
    wherein the component comprises an optical disc drive having a laser and wherein the lock out device disables the laser in response to detecting removal of at least a portion of the housing; and
    wherein the lock out device comprises a magnet integrated in the optical drive and a Hall effect sensor integrated in the housing.

2. The information handling system of claim 1 wherein the lock out device disables the one or more component functions by removing power from the optical disc drive.

3. The information handling system of claim 1 wherein the lock out device disables only the laser.

4. The information handling system of claim 1 wherein the lock out device comprises plural magnets, each magnet integrated in a portion of the housing, and plural Hall effect sensors integrated in the optical disc drive proximate each portion of the housing so that removal of any of the portions of the housing having a magnet disables the optical disc drive laser.

5. The information handling system of claim 4 wherein the portions of the housing comprise a keyboard portion.

6. The information handling system of claim 4 wherein the portions of the housing comprise a palm rest portion.

7. The information handling system of claim 1 wherein the lock out device operates to a condition that removes power from the laser.

8. An information handling system component comprising:
    a chassis;
    electronic devices disposed in the chassis and operable to provide one or more functions;
    a housing operable to enclose the chassis and electronic devices, the housing including at least one portion that also forms a portion of a housing of an information handling system having the component; and
    a lock out device in the chassis and operable to disable one or more functions if the portion of a housing of an information handling system is removed from the chassis, the lock out device having a Hall effect sensor disposed in the chassis and a magnet disposed in the at least one portion of the housing that also forms the housing of the information handling system, the lockout device disabling the one or more functions if the magnet has greater than a predetermined distance from the Hall effect sensor.

9. The information handling system of claim 8 wherein the electronic devices comprise a laser and the lock out device disables the laser from illumination.

10. An information handling system comprising:
    a housing having plural portions;
    a processor disposed in the housing, the processor operable to process information;
    memory disposed in the housing and interfaced with the processor, the memory operable to store information in support of the processor;
    a component disposed in the housing and interfaced with the processor, the component operable to perform one or more functions, the component coupled to one of the plural portions, the one of the plural portions having a magnet; and
    a Hall effect sensor disposed in the component and proximate the magnet, the Hall effect sensor operable to detect detachment of the one of the plural portions of the housing from the component and to disable one or more component functions in response to detecting detachment of the one of the plural portions of the housing from the component.

11. The information handling system of claim 10 wherein the component comprises an optical disc drive and the Hall effect sensor disables a laser of the optical disc drive upon detecting detachment of the one of the plural portions of the housing from the optical disc drive.

* * * * *